United States Patent
Mun et al.

(10) Patent No.: US 9,454,674 B2
(45) Date of Patent: Sep. 27, 2016

(54) DATA SHARING CONTROL METHOD AND DATA SHARING CONTROL TERMINAL

(71) Applicant: SAMSUNG ELECTRONICS CO., LTD., Suwon-si (KR)

(72) Inventors: Min Young Mun, Seoul (KR); Sang Joon Kim, Hwaseong-si (KR); Chang Mok Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 8 days.

(21) Appl. No.: 14/037,664

(22) Filed: Sep. 26, 2013

(65) Prior Publication Data

US 2014/0289872 A1 Sep. 25, 2014

(30) Foreign Application Priority Data

Mar. 25, 2013 (KR) .................. 10-2013-0031356

(51) Int. Cl.
| | |
|---|---|
| *H04L 29/06* | (2006.01) |
| *G06F 21/62* | (2013.01) |
| *H04M 1/725* | (2006.01) |
| *H04W 4/02* | (2009.01) |
| *H04W 12/08* | (2009.01) |

(52) U.S. Cl.
CPC ....... *G06F 21/6245* (2013.01); *G06F 21/6218* (2013.01); *H04M 1/72519* (2013.01); *H04M 1/72522* (2013.01); *H04W 4/02* (2013.01); *H04W 12/08* (2013.01)

(58) Field of Classification Search
CPC .......... G06F 21/6245; G06F 21/6218; H04M 1/72519; H04M 1/72522; H04W 12/08; H04W 4/02

USPC .......................................................... 726/30
See application file for complete search history.

(56) References Cited

U.S. PATENT DOCUMENTS

| | | | | |
|---|---|---|---|---|
| 7,185,056 B2 * | 2/2007 | Fujisawa | ........... | G06F 17/30873 707/E17.111 |
| 7,275,236 B1 * | 9/2007 | Kabe | ................... | G05B 19/056 717/106 |
| 8,200,247 B1 * | 6/2012 | Starenky | ................ | G01C 21/28 455/404.2 |
| 8,255,808 B2 * | 8/2012 | Lindgren | .............. | G06F 3/0481 709/248 |
| 8,370,062 B1 * | 2/2013 | Starenky | ............... | H04W 4/025 340/3.3 |
| 9,189,645 B2 * | 11/2015 | Borzycki | ............ | G06F 21/6218 |
| 2004/0255233 A1 * | 12/2004 | Croney | ................. | G06F 17/248 715/221 |
| 2006/0107304 A1 * | 5/2006 | Cleron | ............... | H04N 5/44543 725/135 |
| 2007/0060116 A1 * | 3/2007 | Asai | .................... | G06F 12/1458 455/418 |

(Continued)

FOREIGN PATENT DOCUMENTS

| | | |
|---|---|---|
| JP | 2004-206676 | 7/2004 |
| JP | 4719488 | 4/2011 |

(Continued)

*Primary Examiner* — David Garcia Cervetti
(74) *Attorney, Agent, or Firm* — NSIP Law (57) ABSTRACT

Provided is a method and apparatus to detect and control flow of data shared in a terminal. A method to control data sharing may include accessing a program that shares a type of data with a terminal, displaying the accessed program on a screen organized by the type of data; and controlling the data to be shared with the accessed program in response to a control signal input on the screen.

18 Claims, 9 Drawing Sheets

(56) References Cited

U.S. PATENT DOCUMENTS

| | | | |
|---|---|---|---|
| 2007/0078953 A1* | 4/2007 | Chai | H04L 65/403 709/219 |
| 2007/0091892 A1* | 4/2007 | Bouchard | H04L 63/10 370/392 |
| 2007/0129958 A1* | 6/2007 | Wu | G06F 9/544 705/38 |
| 2007/0156689 A1* | 7/2007 | Meek | G06F 9/541 |
| 2008/0127310 A1* | 5/2008 | Robbins | G06F 21/6245 726/4 |
| 2008/0256604 A1* | 10/2008 | Fontijn | G06F 21/6218 726/3 |
| 2009/0133070 A1* | 5/2009 | Hamano | G06F 21/6218 725/46 |
| 2009/0240773 A1* | 9/2009 | Kakie | H04M 7/0027 709/205 |
| 2009/0276792 A1* | 11/2009 | Berry | G06F 9/543 719/318 |
| 2010/0318611 A1* | 12/2010 | Curtin | G06F 17/30 709/206 |
| 2011/0141276 A1* | 6/2011 | Borghei | H04W 12/08 348/143 |
| 2011/0154244 A1* | 6/2011 | Howell | G06F 21/6245 715/772 |
| 2011/0185437 A1* | 7/2011 | Tran | H04L 63/104 726/28 |
| 2011/0307276 A1* | 12/2011 | Bernston | G06F 17/30917 705/3 |
| 2012/0041983 A1* | 2/2012 | Jennings | G06Q 10/10 707/784 |
| 2012/0124524 A1* | 5/2012 | Frank Szarfman | G06F 3/0481 715/843 |
| 2012/0154265 A1* | 6/2012 | Kim | G06F 21/84 345/156 |
| 2012/0157044 A1* | 6/2012 | Kim | G06F 21/84 455/410 |
| 2012/0158882 A1* | 6/2012 | Oehme | G06F 17/30224 709/213 |
| 2012/0166997 A1* | 6/2012 | Cho | G06F 21/6218 715/778 |
| 2012/0214442 A1* | 8/2012 | Crawford | H04W 12/06 455/411 |
| 2012/0264480 A1* | 10/2012 | Soundrapandian | G06F 9/5022 455/550.1 |
| 2013/0014136 A1* | 1/2013 | Bhatia | H04N 21/252 725/9 |
| 2013/0054720 A1* | 2/2013 | Kang | G06Q 50/01 709/206 |
| 2013/0091543 A1* | 4/2013 | Wade | G06F 21/54 726/1 |
| 2013/0103759 A1* | 4/2013 | Blom | H04W 4/206 709/204 |
| 2013/0194374 A1* | 8/2013 | Kieft | H04L 67/38 348/14.07 |
| 2013/0217416 A1* | 8/2013 | Matthews, III | H04W 4/028 455/456.2 |
| 2013/0225151 A1* | 8/2013 | King | H04M 1/72577 455/419 |
| 2013/0227014 A1* | 8/2013 | Song | H04L 67/10 709/204 |
| 2013/0227431 A1* | 8/2013 | Vasudevan | H04L 65/403 715/753 |
| 2013/0268357 A1* | 10/2013 | Heath | H04L 63/00 705/14.53 |
| 2013/0278484 A1* | 10/2013 | Hwang | G06F 3/1423 345/2.3 |
| 2013/0295913 A1* | 11/2013 | Matthews, III | H04W 4/046 455/420 |
| 2013/0298037 A1* | 11/2013 | Matthews, III | G06F 3/0484 715/753 |
| 2013/0305354 A1* | 11/2013 | King | G06F 21/31 726/19 |
| 2013/0335316 A1* | 12/2013 | Smith | G06F 3/017 345/156 |
| 2014/0018053 A1* | 1/2014 | Cho | G06F 3/0488 455/418 |
| 2014/0059129 A1* | 2/2014 | Chumbley | G06F 17/30876 709/204 |
| 2014/0059647 A1* | 2/2014 | Immonen | H04L 63/102 726/3 |
| 2014/0059695 A1* | 2/2014 | Parecki | G06F 21/60 726/26 |
| 2014/0065960 A1* | 3/2014 | Gang | H04B 5/0031 455/41.1 |
| 2014/0095692 A1* | 4/2014 | Anderson | H04L 67/22 709/224 |
| 2014/0201285 A1* | 7/2014 | Kong | H04L 67/325 709/204 |
| 2014/0258404 A1* | 9/2014 | Choi | G06F 17/30575 709/204 |
| 2014/0267234 A1* | 9/2014 | Hook | H04W 4/02 345/419 |
| 2014/0282103 A1* | 9/2014 | Crandall | H04L 65/403 715/753 |
| 2014/0282364 A1* | 9/2014 | Woodward | G06F 8/34 717/105 |
| 2014/0282908 A1* | 9/2014 | Ward | H04W 12/12 726/4 |
| 2015/0067534 A1* | 3/2015 | Choi | G06F 3/0482 715/752 |

FOREIGN PATENT DOCUMENTS

| | | |
|---|---|---|
| KR | 10-2009-0103093 | 10/2009 |
| KR | 10-2010-0121974 | 11/2010 |
| KR | 10-0992482 | 11/2010 |
| KR | 10-2011-0038869 | 4/2011 |
| KR | 10-2012-0057871 | 6/2012 |

* cited by examiner

DATA SHARING CONTROL METHOD AND DATA SHARING CONTROL TERMINAL

CROSS-REFERENCE TO RELATED APPLICATION(S)

This application claims the benefit under 35 U.S.C. §119 (a) of Korean Patent Application No. 10-2013-0031356, filed on Mar. 25, 2013, in the Korean Intellectual Property Office, the entire disclosure of which is incorporated herein by reference for all purposes.

BACKGROUND

1. Field

The following description relates to a method and an apparatus to detect and control flow of data shared in a terminal.

2. Description of Related Art

A portable terminal, for example, a smart phone, a tablet, a laptop, a desktop personal computer (PC), an MP3 player, a game console or an electronic device equipped to act as a home appliance, may share various types of data via a communication network. For example, in the case where the terminal is a smart phone, various types of data stored in the terminal may be used in an application installed in the terminal, based on a function of the installed application, without a user being aware that the data is being used as data requirements of the application. For example, when a weather application or a navigation application executes, position information of the terminal may be provided to the weather application or the navigation application. However, the user of the terminal may not recognize that leakage of position information is occurring. In such a situation, leakage refers to the problem created where information is available that a user may want to keep private or otherwise withhold from certain usages, but the information leaks to an application that consumes the data regardless.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a system that includes a method to control data sharing, the method including accessing a program that shares data with a terminal, displaying the accessed program on a screen organized by a type of data, and controlling the data to be shared with the accessed program in response to a control signal input on the screen.

The type of data may include at least one of sensor information sensed by the terminal, user information of the terminal, usage history of the terminal, and authentication information of the terminal.

The sensor information may include at least one of position information of the terminal and acceleration information of the terminal, the user information of the terminal may include financial information of the user, and the usage history of the terminal may include at least one of information on a program installed onto or deleted from the terminal, call history using the terminal, search history using the terminal, a photo stored in the terminal, and a usage log of the terminal.

The displaying may include at least one of a production company of the accessed program, a third party connected to the accessed program, and an icon indicating the accessed program.

The displaying may include displaying a data sharing flow on the screen by connecting the data to the accessed program that shares that type of the data.

The controlling may include blocking a type of data from being shared with an accessed program in response to a touch input of an icon indicating the accessed program that is displayed on the screen is blocked from accessing that type of data.

The controlling may include allowing a type of data to be shared with an accessed program in response to a touch input of an icon indicating the accessed program that is displayed on the screen is allowed to access that type of data.

The data sharing control method may further include collecting program related information of a program installed in the terminal, and storing the collected program related information in a database, wherein the controlling the data to be shared is at least partially based on the program related information in the database.

The data sharing control method may further include re-collecting the program related information of the installed program at time intervals set by the terminal, and updating the program related information stored in the database, based on the re-collected program related information.

The data sharing control method may further include collecting program related information of at least one program installed in the terminal, and storing the collected program related information in a storage medium by filing the collected program related information, wherein the controlling the data to be shared is at least partially based on the program related information in the storage medium.

In another general aspect, there is provided a terminal to control data sharing, the terminal including an tracker configured to access a program that shares data with a terminal, an output unit configured to display the accessed program on a screen organized by the type of data, and a controller configured to control the data sharing with the accessed program in response to a control signal input on the screen.

The output unit may be configured to display at least one of a production company of the accessed program, a third party connected to the accessed program, and an icon indicating the accessed program.

The output unit may be configured to display a data sharing flow on the screen by connecting the data to the accessed program that shares that type of the data.

The controller may include a recognizer configured to recognize a touch input of an icon indicating a program that is displayed on the screen, and a blocker configured to block the data from being shared with the program on which the touch input occurs, in response to a touch event matching the recognized touch input.

The data sharing control terminal may further include a collector configured to collect program related information of the program installed in the terminal, and a storage configured to store the collected program related information in a database, wherein the controller controls the data sharing based at least partially on the program related information in the database.

The data sharing control terminal may further include a re-collector configured to re-collect the program related information of the installed program at time intervals set in the terminal, and an updater configured to update the program related information stored in the database, based on the re-collected program related information.

The data sharing control terminal may further include a collector configured to collect program related information of the program installed in the terminal, and a file processing unit configured to file the collected program related information, wherein the controller controls the data sharing based at least partially on the program related information in the file.

In another general aspect, there is provided a method to control data sharing, including collecting application and settings information, at a terminal of an application with data sharing environment settings to be changed, generating, at the terminal, a data sharing controlling page based on the application information and the settings information, and displaying, at the terminal, the data sharing controlling page comprising a data flow of a type of data shared by the application.

The method may further include crawling information about a creator of the application and the data accessible by the application.

The method may additionally further include storing the crawled information, and updating a database with information changing the data sharing environment settings.

In another general aspect, there is provided a terminal to generate and display a page for controlling data sharing, including a collector configured to collect application settings information about an application with data sharing environment settings to be changed, and an output unit configured to generate a data sharing controlling page based on the stored application information and the settings information, and display the data sharing controlling page comprising a data flow of a type of data shared by the application.

In an embodiment, the collector is configured to crawl information about a creator of the application and the data accessible by the application.

In an embodiment, the collector is further configured to store the crawled information, and update a database with information changing the data sharing environment settings.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Hereinafter, embodiments will be described in detail with reference to the accompanying drawings.

The following embodiments may be applied to a portable terminal. As a non-exhaustive illustration only, a terminal described herein may refer to mobile devices such as cellular phone, which may be a smart phone, a personal digital assistant (PDA), a digital camera, a portable game console, an MP3 player, a portable/personal media player (PMP), a handheld e-book, a portable laptop PC, a global positioning system (GPS) navigation, a tablet, a sensor, and devices such as a desktop PC, a high definition television (HDTV), an optical disc player, a set-top box, a home appliance, and the like that are capable of data processing consistent with that which is disclosed herein.

In general, a portable terminal may include a hardware layer, a platform configured to process a signal input from the hardware layer and to transfer the processed input signal for further use, and an application program layer including various types of applications programs that are operated based on the platform. For example, the platform may include an operating system (OS) that mediates interaction and data connectivity between the application program layer and the hardware layer.

Some examples of platforms may include ANDROID platform, WINDOWS MOBILE platform, IOS operating system (IOS) platform, and the like, that provide an operating system (OS) for a portable terminal. Each platform may have a different structure, in that these platforms have different designs and software architectures and may be designed to be compatible with certain specific hardware layers. While specific platforms may include certain platform-specific features and functionality, in some instances these platforms may have an identical basic functionality, so that they are able to perform certain core functions such as memory management or handling user inputs.

The ANDROID platform acts to manage various types of hardware, and may include a LINUX kernel layer configured to transfer a request of an application program to hardware, and configured to transfer a response from the hardware to the application program. Additionally, the ANDROID platform may manage a library layer, including C or C++ code, to connect hardware with a framework layer and to allow the framework layer to manage various types of application programs.

In the case of the WINDOWS MOBILE platform, a WINDOWS core layer corresponds to the LINUX kernel layer used in the context of the ANDROID platform. The WINDOWS MOBILE platform may include an interface layer configured to connect the WINDOWS core layer with an application program layer, and configured to support various types of languages and functions that are provided to the application program layer so that the applications can provide their own functionality.

In the case of the IOS platform, a core OS layer corresponds to the LINUX kernel layer of ANDROID. A core service layer may be similar to the library layer and the framework layer of ANDROID. The IOS platform may include a media layer to provide a multimedia functionality and a COCOA touch layer to serve as support layers for various types of applications.

Herein, each layer may also be expressed as a block that incorporates various functionality and capabilities. For example, the framework layer and a similar layer corresponding thereto may each be defined as a hardware block configured to run appropriate software to provide the functionality of these layers. The following embodiments may be configured on a variety of platforms of a portable terminal, but are not limited to the aforementioned platform types.

An application used in the following description may refer to an application program run by the portable terminal. For example, an application may refer to an "app" that is run on a smart phone or media player, on one of the platforms discussed above (ANDROID, WINDOWS MOBILE, or IOS). However, an application may also refer to an application designed to run on an operating system for a desktop or laptop, such as WINDOWS, MACOS or LINUX.

Figure 1:
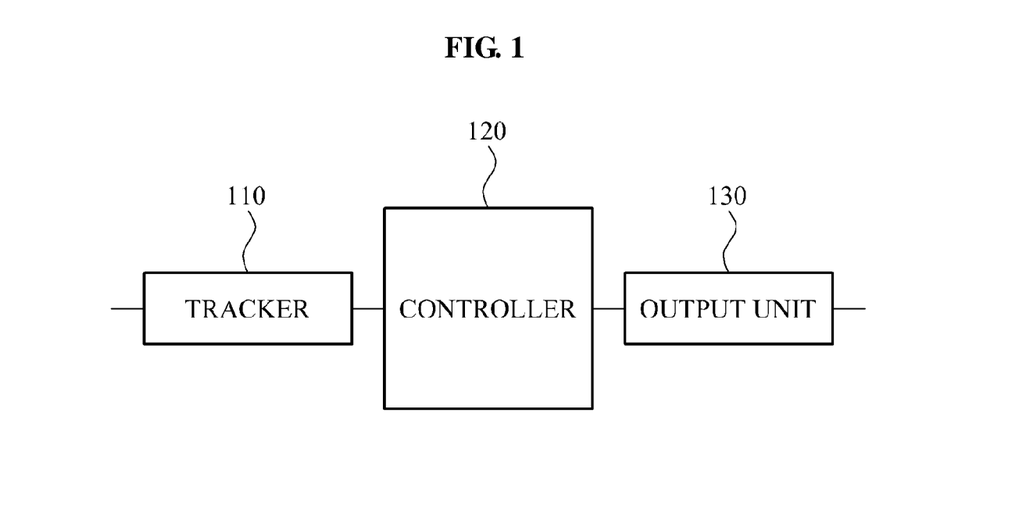
FIG. 1 is a block diagram illustrating an example of a terminal configured to control data sharing.

FIG. 1 is a block diagram of a terminal configured to control data sharing. Hereinafter, the terminal may also be referred to as a data sharing control terminal.

Referring to FIG. 1, the data sharing control terminal includes a tracker 110, a controller 120, and an output unit 130.

The tracker 110 may track and provide access to a program that shares data with the terminal. For example, the tracker 110 may obtain information about data used by the program, using a program manager for the terminal, and may track and provide access to the program that uses the data. In this example, the program under consideration is a program that has access to resources of the terminal. The program manager manages such a program installed in the terminal, and manages data input to the program and data output from the program. For example, in a smart phone, an application manager may perform functionality of the program manager. Such a program manager is able to gather information about the activities of programs as they execute, and this information can be used as will now be discussed in greater detail.

As an example, data used by the programs includes sensor information. The sensor information, in this example, includes various types of information that may be sensed using a sensor installed in the terminal, such as position information of the terminal and/or acceleration information of the terminal. For example, information about position may be obtained from a source such as a global positioning system (GPS) sensor, and acceleration may be obtained from an accelerometer. However, the data is not limited to information about location or change of location. Other sensors, including, as examples, gyroscopes, thermometers, microphones, light sensors, and any other analog or digital sensor that can be used to gather data for the terminal may be sensed by an appropriate sensor coupled to the terminal, and will provide data whose distribution is to be regulated, as will be discussed further, below.

As another example, data used by the programs includes user information of the terminal. The user information includes financial information of a user of the terminal. For example, the financial information may include identifier (ID) information of a card used by the terminal user, such as a credit card or debit card, public certificate information, such as for encryption and security purposes, personal information, such as identifying information, and the like.

As another example, data includes usage history for the terminal. The usage history of the terminal includes at least one piece of information related to a program, for example, an application. The usage history information includes a record of when an application was installed on or deleted from the terminal. The usage history may also contain records related to telephone calls and other communication sessions such as videoconferences, such as a callee record and call history record using the terminal. Additionally, the usage history includes a search history of queries sent using the terminal, such as queries to a search engine or a data repository, a record of photos and/or other images stored in the terminal. Furthermore, the usage history includes a usage log of the terminal, where the usage log includes a record of inputs made by a user to the terminal, such as touches, gestures, and button selections, as well as any voice or audio inputs.

As another example, the data may include authentication information of the terminal. The authentication information of the terminal indicates unique ID information, such as a serial number of the terminal. However, other information may be used to authenticate the terminal, such as a digital certification or other information that can help establish the identity of the terminal.

The output unit 130 displays information related to the data gathered for the accessed at least one program on a single screen for each type of the data gathered. In some embodiments, the output unit 130 displays this information on a single screen, but other embodiments may display this information split over multiple screens. The output unit 130 may display a program sharing data for each type of data on a screen of the terminal. The types of data may be distinguished from each other based on content included in the data. For example, the output unit 130 may display, optionally on a single screen, programs that share sensor information, programs that share user information, and programs that share authentication information. The operation of an output unit 130 in such a situation will be illustrated later with respect to FIG. 4. Furthermore, the output unit 130 is a structural unit, such as a transmitter, configured to transmit, output, or display information.

The output unit 130 displays at least one of a production company of the accessed at least one program, a third party connected to the accessed at least one program, and an icon indicating the accessed at least one program. The third party may indicate an individual, an institution, or a company that provides or uses a program. By displaying this information, the output unit 130 provides information to the user that will help the user control how information flows between data sources at the terminal.

As an example, in a case in which the data includes a photo and the photo is automatically shared with a predetermined user through a photo sharing program, the output unit 130 may display, on a screen, information associated with the predetermined user that was previously set in the photo sharing program. As another example, in a case in which the data is position information of the terminal and a network search and authentication program use the position information in order to search for a wireless fidelity (WiFi) network accessible by the terminal, the output unit 130 may display information about a communication company that provides the WiFi network. The operation of an output unit 130 in such a situation will be illustrated later with respect to FIG. 5.

The output unit 130 displays a data sharing flow, optionally on a single screen, by connecting data to the accessed at least one program for each type of the data. In an embodiment in which a flow of data shared between programs is displayed on a single screen using the output unit 130, a user may verify at a glance programs that are using data stored in the terminal. The operation of an output unit 130 in such a situation will be illustrated later with respect to FIG. 6.

The controller 120 may control how data is to be shared with the accessed at least one program in response to a control signal input on the screen. The control signal may include, for example, a touch signal, a voice signal, and/or a motion signal. Based on the control signal, the controller 120 can interpret the control signal and subsequently determine how to regulate data flow.

For example, the controller 120 may block data from being shared with a program on which a touch input occurs, in response to the touch input of an icon indicating a program that is displayed on the screen. That is, in this situation, the touch input may be provided so as to indicate that the user no longer wishes a certain type of data to be available to that program. A program of which data sharing is blocked may disappear from the screen. For example, when an icon of the program is moved to a recycle bin icon through a touch drag in a smart phone, sharing of data with the program corresponding to the moved icon may be suspended. The operation of the controller 120 in such a situation will be illustrated later with respect to FIG. 6.

The controller 120 may control data to be shared with another program in response to a touch input of an icon indicating a program displayed on the screen. For example, when a touch drag to an area of user information occurs after a touch input occurs on an icon of a program using position information, use of the position information may be blocked and use of user information may be allowed in the program instead. That is, such a touch input may be interpreted to indicate that the desired sharing permissions have changed, so that position information should no longer be accessible from the program, but now user information should be accessible from the program.

For example, a data sharing allowing area may be set for each type of data on the screen. Specifically, by dividing the screen into four areas, sharing of first data may be allowed in a first area, sharing of second data may be allowed in a second area, sharing of third data may be allowed in a third area, and sharing of fourth data may be allowed in a fourth area. When a program sharing the first data in the first area moves from the first area to the second area in response to a touch input, such as a touch drag, the program is disallowed to use the first data and be allowed to use the second data.

For example, the controller 120 acquires information associated with an area in which sharing of data is allowed, and determines a type of data used by a program based on screen areas in which a touch input starts and is terminated.

For example, operations of the tracker 110, the controller 120, and the output unit 130 may be performed by a processor included in a hardware system architecture, for example a computer processor that is included in a computing terminal.

The controller 120 executes or performs the overall control of the data sharing control terminal, and may potentially include the functionality of the tracker 110 and the output unit 130. In FIG. 1, the tracker 110, the controller 120, and the output unit 130 are separately configured to clearly describe functions thereof. Accordingly, when a product is actually produced, all of or a portion of the functionality of the tracker 110, the controller 120, and the output unit 130 may be configured to be executed or performed by the controller 120.

The tracker 110, the controller 120, and the output unit 130 may be implemented using hardware components. The hardware components may include, for example, processors, controllers, microcomputers, microprocessors, and other equivalent electronic components.

Figure 2:
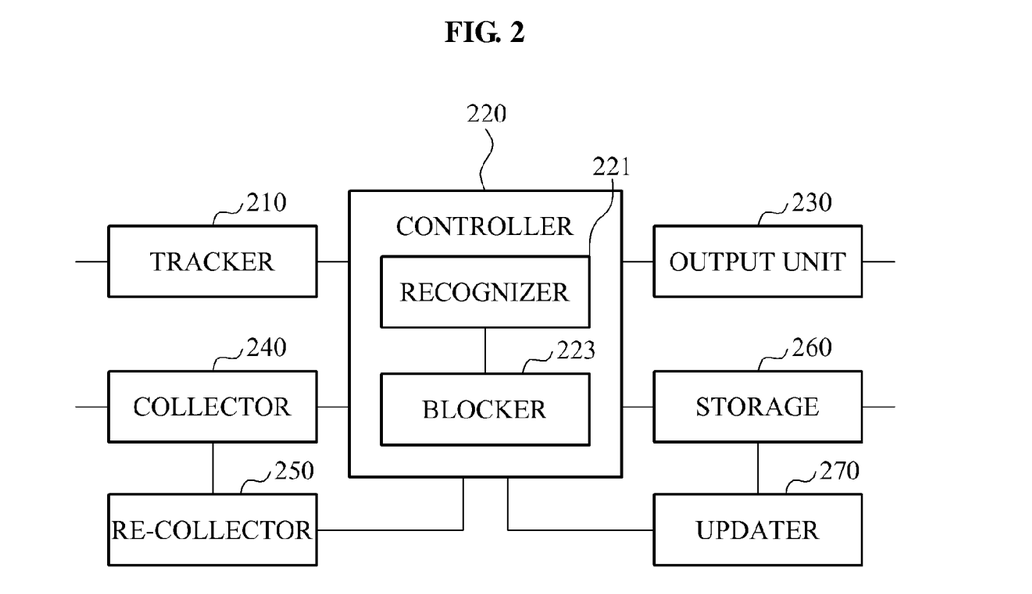
FIG. 2 is a block diagram illustrating another example of a terminal configured to control data sharing.

FIG. 2 is a block diagram illustrating another example of a terminal configured to control data sharing.

Referring to FIG. 2, the data sharing control terminal includes a tracker 210, a controller 220, an output unit 230, a collector 240, a re-collector 250, a storage 260, and an updater 270.

The tracker 210 may track and access at least one program that shares data stored in the terminal. The tracker 210 obtains information about data the at least one program uses through a program manager of the terminal, and tracks and accesses the program using the data.

The output unit 230 displays the accessed at least one program, optionally on a single screen, for each type of the data. The output unit 230 may also display a program sharing data for each type of data on a screen of the terminal. A type of data may be distinguished from another type of data based on content included in the data. For example, the output unit 230 displays, on a single screen, programs that share sensing information, programs that share user information, and programs that share authentication information.

The controller 220 controls data to be shared with the accessed at least one program in response to a control signal input on the screen. The control signal may include, for example, a touch signal, a voice signal, and/or a motion signal. However, in the embodiment presented in FIG. 2, additional structures may be defined. For example, the controller 220 may include a recognizer 221 and a blocker 223.

The recognizer 221 recognizes a touch input of an icon indicating a program that is displayed on the output unit 230. The recognizer 221 includes a touch sensor or a touch module to recognize the touch input and additional information about the touch input, such as an icon on which the touch input occurs. For example, if the terminal is a smart phone, the output unit 230 may be a touchscreen of the smart phone. In this embodiment, the touchscreen acts as the output unit 230 by displaying output to the user, but the touchscreen also acts as the recognizer 221 because the touchscreen is able to identify touch inputs. Also, the recognizer 221 may recognize the occurrence of a touch input which includes a gesture or multitouch input, such as a touch drag, double touch, and/or a long touch, for example, which may occur on the icon. Also, the recognizer 221 retrieves and identifies a touch event matching each touch input. For example, the recognizer 221 retrieves and identifies, as a touch event matching the touch drag input, an event for executing an application corresponding to the positions whose icon is moved by the touch drag. Also, the recognizer 221 may retrieve, as a touch event matching double touches, an event in which an application is automatically deleted from the screen. Also, the recognizer 221 may retrieve, as a touch event matching the long touch, an event for displaying a list of instructions, such as delete, store, and move of a program on which the touch input occurs. Thus, various touch inputs are processed by the recognizer 221, which receives a signal based on the touch event or gesture that has occurred and assigns the touch event or gesture a significance in the context of controlling data flow within the terminal.

The blocker 223 blocks data from being shared with a program on which the touch input occurs, in response to a touch event matching the recognized touch input. The touch event may include an instruction to block data sharing. For example, in order for the blocker 223 to block data from being shared, the blocker 223 may prevent a request for the data from the blocked program from being fulfilled after that program has been blocked.

The recognizer 221 recognizes a voice input and a motion input in addition to or instead of the touch input. Voice input and motion input are only examples of other types of input, and should not be taken to be limiting. For example, the recognizer 221 retrieves an event matching the voice input and also retrieves an event matching the motion input. Based on the event recognized by the recognizer 221, the controller 220 and the blocker 223 can regulate data availability for the terminal.

The collector 240 collects program related information of at least one program installed in the terminal. The program related information may include, for example, a creator of a program, a type of data accessible by the program, and capacity and version of the program. Other types of program related information may be available. For example, programs may be associated with metadata that describe the programs, and the metadata may provide useful insights about how to regulate dataflow to and from those programs. For example, the collector 240 collects program related information using a crawling technique. The collector 240 collects program related information when a program is installed, and may also collect program related information at a predetermined point in time according to control of the controller 220. Once the collector 240 gathers the program related information, the program related information may be shared with the controller 220 and stored in storage 260 to help establish how data should be shared with the programs.

The re-collector 250 re-collects program related information of the installed at least one program at time intervals set in the terminal. Because a type of data used by a program may vary, the re-collector 250 re-collects program related information at predetermined time intervals. The re-collector 240 may also manually re-collect program related information in response to a user input.

The storage 260 stores, in a database, program related information collected by the collector 240.

The updater 270 updates the stored program related information stored in storage 260, based on program related information re-collected by the re-collector 250.

For example, operations of the tracker 210, the controller 220, the output unit 230, the collector 240, the re-collector 250, the storage 260, and the updater 270 may be performed by a processor included in a hardware system architecture, for example a computer processor that is included in a computing terminal.

The controller 220 may perform the overall control of the data sharing control terminal, and may potentially include functionality of the tracker 210, the output unit 230, the collector 240, the re-collector 250, the storage 260, and the updater 270. In FIG. 2, the tracker 210, the controller 220, the output unit 230, the collector 240, the re-collector 250, the storage 260, and the updater 270 are separately configured to clearly describe functions thereof. Accordingly, when a product is actually produced, all of or a portion of the functionality of the tracker 210, the controller 220, the output unit 230, the collector 240, the re-collector 250, the storage 260, and the updater 270 may be configured to be provided by the controller 220.

Figure 3:
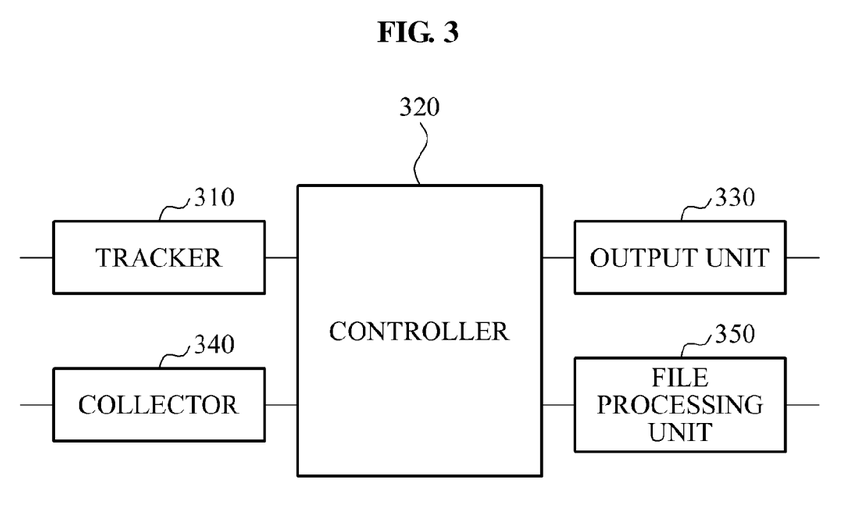
FIG. 3 is a block diagram illustrating still another example of a terminal configured to control data sharing.

FIG. 3 is a block diagram illustrating still another example of a terminal configured to control data sharing.

Referring to FIG. 3, the data sharing control terminal includes a tracker 310, a controller 320, an output unit 330, a collector 340, and a file processing unit 350.

The tracker 310 provides access to at least one program that shares data stored in the terminal. The tracker 310 obtains information about data used by a program, using a program manager of the terminal, and may access the program using the data.

The output unit 330 displays the accessed at least one program, optionally on a single screen, for each type of the data. The output unit 330 displays a program sharing data for each type of data on a screen of the terminal. A type of data may be distinguished from another type of data based on content included in the data. For example, the output unit 330 displays, optionally on a single screen, programs that share sensor information, programs that share user information, and programs that share authentication information.

The controller 320 controls data to be shared with the accessed at least one program in response to a control signal input on the screen. The control signal includes, for example, a touch signal, a voice signal, and/or a motion signal.

The collector 340 collects program related information of at least one program installed in the terminal. The program related information includes, for example, a creator of a program, a type of data accessible by the program, and capacity and version of the program. For example, the collector 340 collects program related information using a crawling technique. The collector 340 collects program related information when a program is installed, and may also collect program related information at a predetermined point in time according to control of the controller 320.

The file processing unit 350 files program related information collected by the collector 340. The file processing unit 350 stores, in a storage medium, to-file converted program related information. The storage medium may include, for example, a memory, a buffer, and a cache of a processor. The storage medium may use any type of appropriate storage, such as RAM, which may be static RAM or dynamic RAM, a solid-state drive (SSD), a hard drive, flash memory, an optical drive, or any other type of storage that can retain in memory the program related information.

For example, operations of the tracker 310, the controller 320, the output unit 330, the collector 340, and the file processing unit 350 may be performed by a processor included in a hardware system architecture, for example a computer processor that is included in a computing terminal.

The controller 320 performs the overall control of the data sharing control terminal, and may potentially include functionality of the tracker 310, the output unit 330, the collector 340, and the file processing unit 350. In FIG. 3, the tracker 310, the controller 320, the output unit 330, the collector 340, and the file processing unit 350 are separately configured to clearly describe functions thereof. Accordingly, when a product is actually produced, all of or a portion of the functionality of the tracker 310, the controller 320, the output unit 330, the collector 340, and the file processing unit 350 may be configured to be provided by the controller 320.

Figure 4:
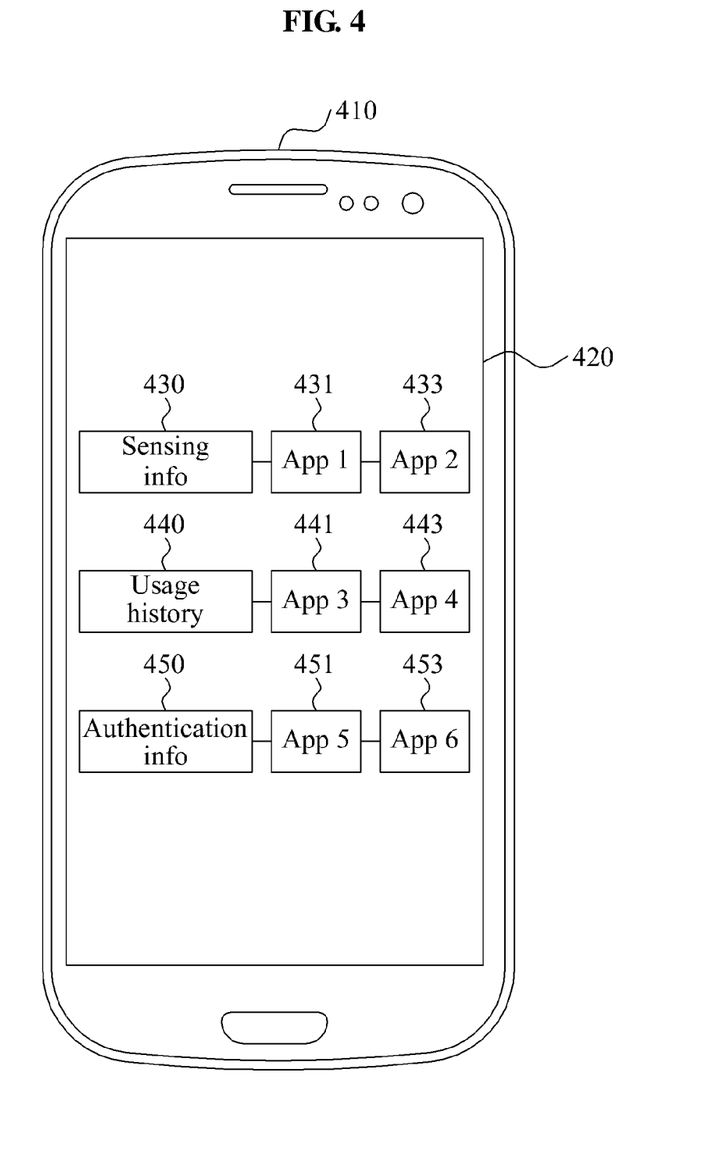
FIG. 4 is a screenshot illustrating an example of displaying, on a single screen, applications that share data for each type of data.

FIG. 4 is a screenshot illustrating an example of displaying, on a single screen, applications that share data for each type of data.

Referring to FIG. 4, sensor information 430, usage history 440, and authentication information 450 are displayed on a screen 420 of a terminal 410. In FIG. 4, the terminal is presented as a smart phone. The sensor information 430, the usage history 440, and the authentication information 450 are examples of types of data that may be stored in the terminal 410.

The sensor information 430 is portrayed in FIG. 4 as being used in a first application (App 1) 431 and a second application (App 2) 433. For example, the sensor information 430 may include position information of the terminal 410 and acceleration information of the terminal 410. As discussed above, these are simply examples and the sensor information 430 is not limited to these examples. Each of the first application 431 and the second application 433 may be one of a weather application, a map application, a search application, a social networking service (SNS) application, and an exercise application. If the first application 431 is a weather application, in one illustrative example, knowing the user's location would be helpful in ascertaining which weather is most relevant to the user.

The usage history 440 is being used in a third application (App 3) 441 and a fourth application (App 4) 443. For example, the usage history 440 may include information associated with an application installed in or deleted from the terminal 410. Each of the third application 441 and the fourth application 443 may be one of an individual taste search application, a genius program, and an App recommend application. Again, the user's usage history 440 may be very helpful in making recommendations. For example, if the user performs a large number of searches related to Indian culture, and wishes a restaurant recommendation, it may be helpful to use the usage history to determine that the user might especially enjoy eating at an Indian restaurant.

The authentication information 450 is being used in a fifth application (App 5) 451 and a sixth application (App 6) 453. For example, the authentication information 450 may include unique ID information of the terminal 410 or log information of a user of the terminal 410. Each of the fifth application 451 and the sixth application 453 may be one of an App market application, a music application, iTunes, and App store. Yet again, being able to determine a unique ID for the terminal may be quite helpful for goals such as managing DRM.

By displaying, on the single screen 420 of the terminal 410, applications that use data stored in the terminal 410, the user of the terminal 410 may easily verify a data sharing flow. That is, by observing which applications are connected to which data sources, it is clear whether a given application has access to certain types of information. For example, in an embodiment, if an application is not specifically given access to a type of data, then it will be assumed that the application is not authorized to receive that data. Alternatively, the opposite approach may be used, in which applications are generally permitted to receive data and the user provides a way of blocking access from specific sources.

Also, the user may block data from being used by an application on which a touch input occurs on the screen 420 by generating the touch input on the application. Accordingly, without a need to enter into a separate setting page, it is possible to block data from being shared with a predetermined application.

Figure 5:
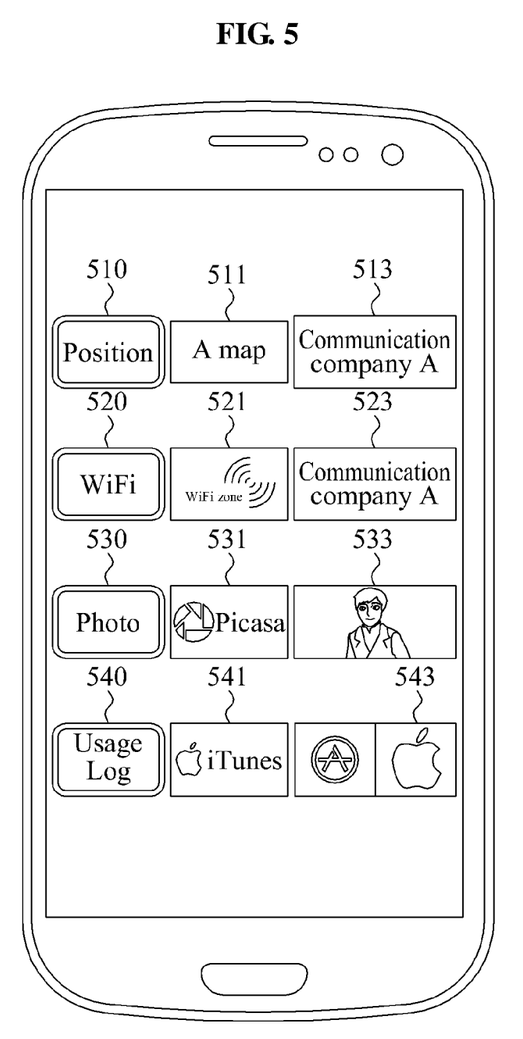
FIG. 5 is a screenshot illustrating an example of displaying, on a single screen, a third party sharing data for each type of data.

FIG. 5 is a screenshot illustrating an example of displaying, on a single screen, a third party that shares data for each type of data.

Referring to FIG. 5, data is classified into position data 510, WiFi data 520, photo data 530, and a usage log 540 and thereby displayed on a screen.

The position data 510 may include position information for a terminal. The position information may be measured by a variety of techniques and sensors, for example, global positioning system (GPS) information, assisted GPS (A-GPS) information, and WiFi based position information. An A map application 511 and a communication company A 513 using the position data 510 may be displayed on a screen. The communication company A 513 may be displayed as a creator of the A map application 511. Alternatively, the communication company A 513 may be tracked and accessed in terms of using the position data 510 through another program and be displayed. For example, another map application or another application that utilizes position data 510 on behalf of the communication company A 513 would also depict communication company A 513 as being a party with whom the position data 510 is shared.

The WiFi data 520 may include position information and authentication information of the terminal, that are required to use WiFi. An application 521 to search for an accessible WiFi network and to perform an authentication process and a communication company A 523 to provide the WiFi network may be displayed together. When search of and access to the WiFi network is automatically allowed based on setting of the terminal, the WiFi data 520 may be shared with the application 521 and the communication company A 523.

The photo data 530 may be displayed together with a photo viewer application 531 and a person 533 sharing a photo. For example, the photo data 530 may be periodically synchronized between users allowing photos to be shared through an SNS application or a photo sharing application. Here, a user allowing photos to be shared may be displayed.

The usage log 540 may be displayed together with an application 541 utilizing the usage log 540 and a company 543 that obtains information through the application 541 and uses the obtained information for statistics and development of technology.

Thus, an aspect of the embodiment of FIG. 5, as has been presented in these examples, is that there are various types of data that are managed by the terminal, which are requested by certain applications and subsequently available to and used by third parties that share the data, in situations where the user wants that sharing to take place.

Although not illustrated in FIG. 5, it is possible to change a type of data viewed on a screen by locating a scroll bar on left or right of the screen and adjusting the scroll bar.

Figure 6:
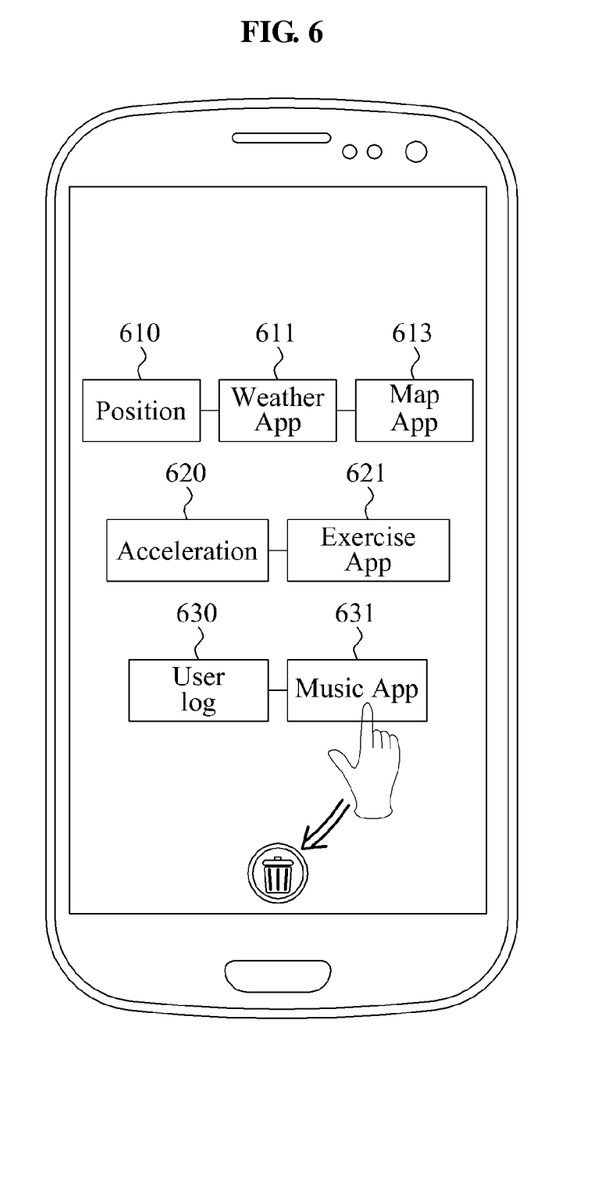
FIG. 6 and FIG. 7 are screenshots illustrating examples of an interface to configure data sharing of an application in response to a control signal input on a screen.
Figure 7:
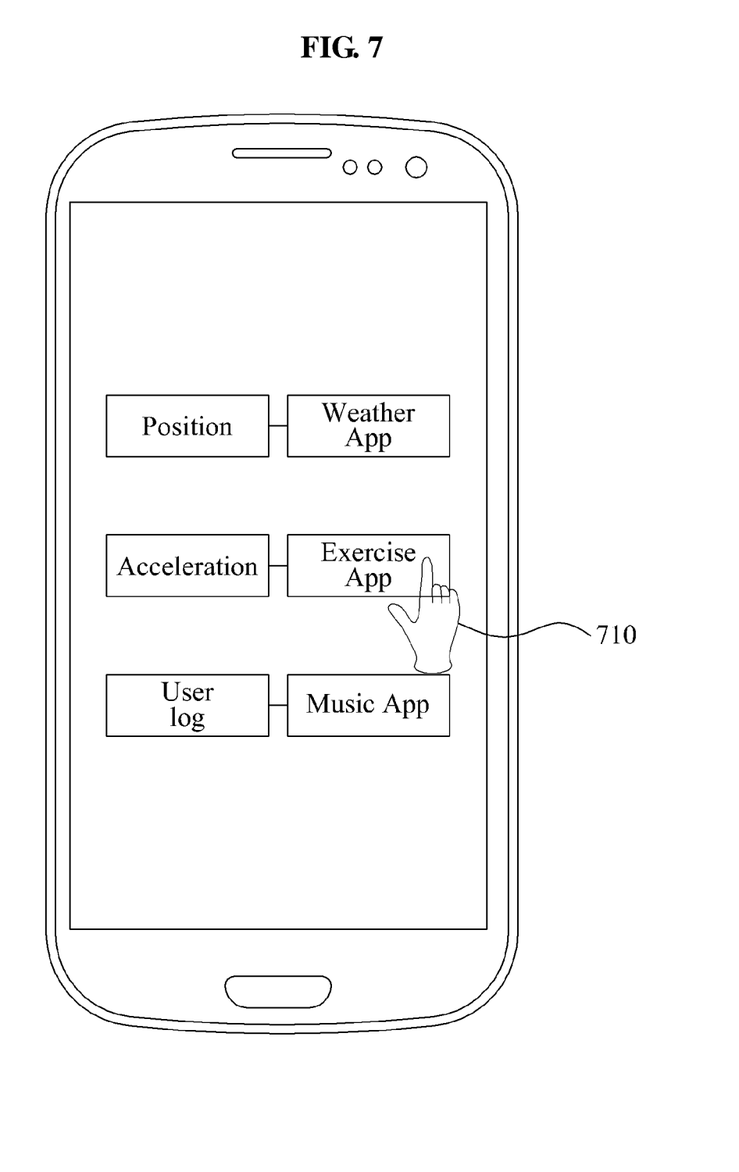

FIG. 6 and FIG. 7 are screenshots illustrating examples of an interface to configure data sharing of an application in response to a control signal input on a screen.

Referring to FIG. 6, the screen displays, position data 610 together with a weather application 611 and a map application 613. The display of the position data 610 together with the weather application 611 and the map application 613 may indicate that the position data 610 is being used in the weather application 611 and the map application 613.

Furthermore, displaying acceleration data 620 together with an exercise application 621, indicates that the acceleration data 620 is being used in the exercise application 621.

Additionally, displaying, on the screen, a user log 630 together with a music application 631, indicates that the user log 630 is being used in the music application 631.

Accordingly, it is possible to display, optionally on a single screen, applications that are using a variety of data by placing a type of data in proximity to applications that interact with and use that data.

Additionally, input such as touch input may be used to control and change aspects of data flow for applications. For example, a user may touch on an icon indicating the music application 631, and then the icon is moved to a recycle bin area by a touch drag gesture. The result of such a gesture is that the music application 631 may be blocked from using the user log 630, and the icon indicating the music application 631 may no longer be displayed next to user log 630.

Accordingly, through a simple touch input and manipulation, it is possible to block data from being shared with a predetermined application among applications sharing the data.

Referring to FIG. 7, for example, when a touch input 710 occurs on an exercise application, the exercise application may be deleted from the screen and may not use acceleration data any more. The touch input 710 may persist for a certain amount of time in order for the exercise application to be deleted. As another example, when the touch input 710 occurs, a list of processing instructions regarding how to process the exercise application may be displayed on the screen, such as a menu that offers the choices "Delete" and "Do Not Delete."

Figure 8:
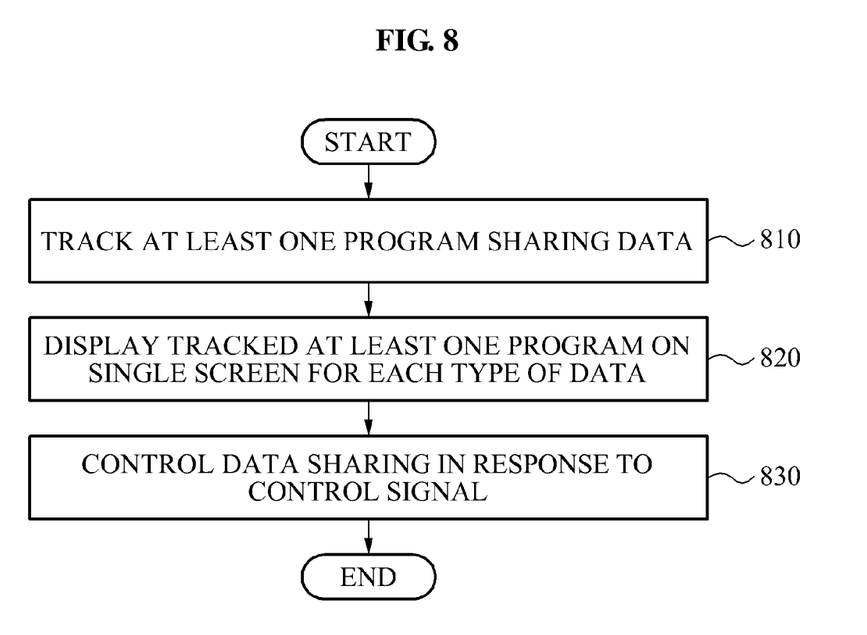
FIG. 8 is a flowchart illustrating an example of a method to control data sharing.
Figure 9:
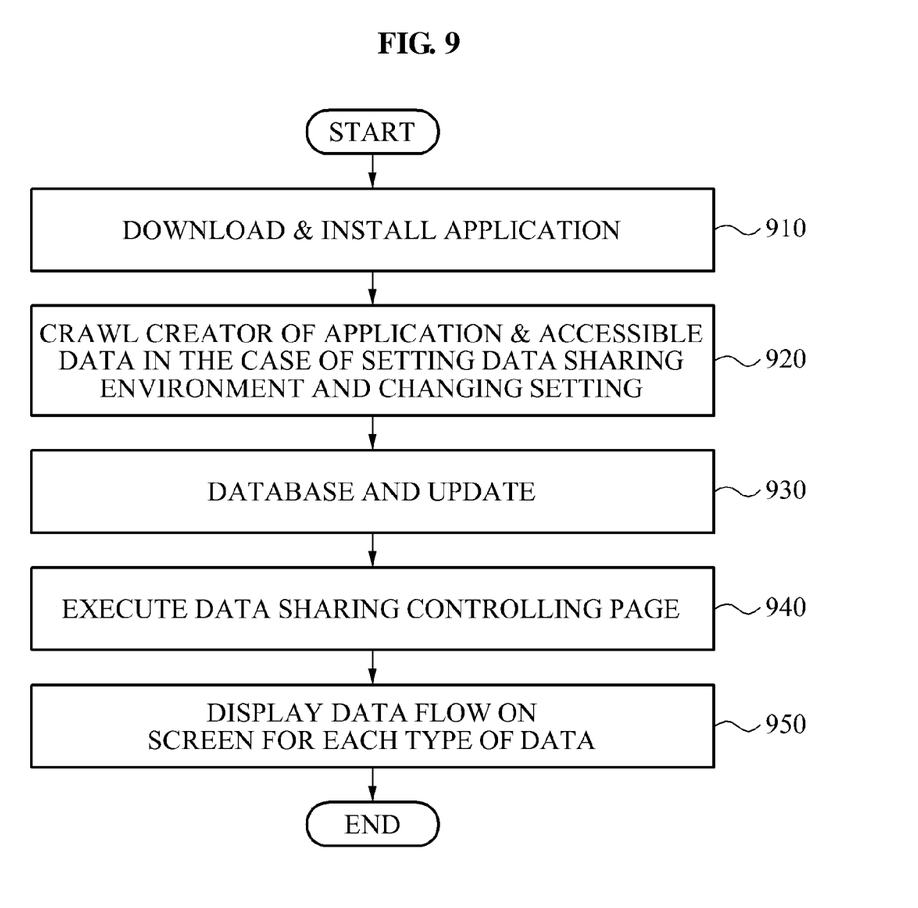
FIG. 9 is a flowchart illustrating another example of a method to control data sharing.
Figure 10:
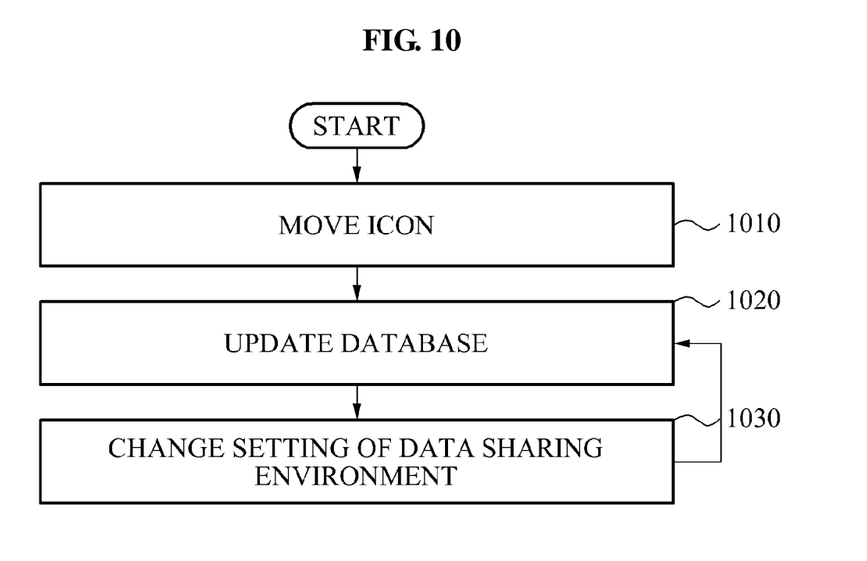
FIG. 10 is a flowchart illustrating still another example of a method to control data sharing.

FIG. 8 is a flowchart illustrating an example of a method to control data sharing, FIG. 9 is a flowchart illustrating another example of a method to control data sharing, and FIG. 10 is a flowchart illustrating still another example of a method to control data sharing.

Referring to FIG. 8, in operation 810, a data sharing control terminal tracks and accesses at least one program that shares data stored in the terminal. The data sharing control terminal obtains information about data used by a program, using a program manager of the terminal, and tracks and accesses the program using the data. The program manager manages a program installed in the terminal, and manages data input to the program and data output from the program. For example, in a smart phone, an application manager may perform functionality of the program manager.

In operation 820, the data sharing control terminal displays the tracked and accessed at least one program on a screen for each type of the data. The data sharing control terminal may display a program sharing data for each type of data on a screen of the terminal. A type of data may be distinguished from another type of data based on content included in the data. For example, the terminal to control data sharing may display, optionally on a single screen, programs that share sensor information, programs that share user information, and programs that share authentication information.

The data sharing control terminal may display at least one of a production company of the tracked and accessed at least one program, a third party connected to the tracked and accessed at least one program, and an icon indicating the tracked and accessed at least one program.

The data sharing control terminal may display a data sharing flow on the single screen by connecting data to the tracked and accessed at least one program for each type of the data.

In operation 830, the data sharing control terminal may control data to be shared with the tracked and accessed at least one program in response to a control signal input on the screen.

The data sharing control terminal may block data from being shared with a program on which a touch input occurs, in response to the touch input of an icon indicating the tracked and accessed at least one program that is displayed on the screen.

The data sharing control terminal controls data to be shared with another program in response to a touch input of an icon indicating the tracked and accessed at least one program that is displayed on the screen.

According to an embodiment, a method to control data sharing may be configured as an application or a program, and may be installed in a terminal as a basic program. Alternatively, the method to control data sharing may be configured as a separate downloadable and installable application.

The description made with reference to FIG. 8 corresponds to the description made above with reference to FIG. 1 and thus, the description of FIG. 1 may also be applied to FIG. 8.

FIG. 9 illustrates an example of generating and executing a page for controlling data sharing.

Referring to FIG. 9, in operation 910, a data sharing control terminal downloads an application and installs the downloaded application.

In operation 920, in the case of setting a data sharing environment and changing the setting, the data sharing control terminal crawls information about a creator of the installed application and data accessible by the application in operation 920.

In operation 930, the data sharing control terminal databases the crawled information and updates a database with information updated changing the setting.

In operation 940, the data sharing control terminal executes a data sharing controlling page based on an input of a user. The data sharing controlling page may be a page that is configured as a basic program of the terminal, and may also be a page that is supported by an external application.

In operation 950, the data sharing control terminal displays, on a screen, a data flow for each type of data. For example, the data flow may be displayed by connecting applications using data for each type of data or by connecting a third party for each area.

FIG. 10 illustrates an example to modify a data sharing policy.

Referring to FIG. 10, in operation 1010, a data sharing control terminal moves an icon in response to a touch input on the icon. When the icon is moved to a recycle bin icon, data sharing of an application corresponding to the icon may be blocked. Alternatively, when the icon is moved to another data sharing area, the application corresponding to the icon may start to share corresponding data.

In operation 1020, the data sharing control terminal updates a database indicating sharing applications for each type of data. The update would indicate whether an application is blocked from sharing data, or whether the application starts to share another data in response to movement of the icon.

In operation 1030, the data sharing control terminal changes a setting of a data sharing environment by applying the movement of the icon and the update result of the database. For example, a change may occur in a sharing application for each type of data displayed on the screen. An application blocked from sharing data may disappear from the screen.

According to embodiments, a method to control data sharing generates a unified page that is a data sharing snapshot, thereby enabling a user to verify a data sharing flow at a glance.

According to embodiments, a method to control data sharing also generates a list of latest applications and/or third parties using data for each type of data and may display the generated list on a single screen.

According to embodiments, a method to control data sharing easily changes a data sharing setting by moving data and an icon of an application using a touch scheme on a single screen.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of non-transitory computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files including higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments that accomplish the examples disclosed herein can be easily construed by programmers skilled in the art to which the examples pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method to control data sharing, comprising:
   tracking, using a tracker, a program that shares data with a terminal, by using information about data the program shares obtained from a program manager of the terminal;
   displaying, using an output unit, the tracked program on a screen organized according to types of data, and displaying a data-sharing flow on the screen, by displaying a connection between a type of data and the tracked program; and
   controlling, using a controller, the data to be shared with the tracked program, in response to a control signal input on the screen and is recognized by a recognizer, by blocking a type of data from being shared with the tracked program in response to the control signal indicating that the tracked program is blocked from accessing that type of data.

2. The method of claim 1, wherein the types of data comprise:
   sensor information sensed by the terminal,
   user information of the terminal,
   usage history of the terminal, and
   authentication information of the terminal.

3. The method of claim 2,
   wherein the sensor information comprises at least one of:
      position information of the terminal, and
      acceleration information of the terminal;
   wherein the user information of the terminal comprises financial information of the user; and
   wherein the usage history of the terminal comprises at least one of:
      information on a program installed onto or deleted from the terminal,
      a call history using the terminal,
      a search history using the terminal,
      a photo stored in the terminal, and
      a usage log of the terminal.

4. The method of claim 1, wherein the displaying comprises displaying at least one of:
   a production company of the tracked program,
   a third party connected to the tracked program, and
   an icon indicating the tracked program.

5. The method of claim 1, wherein the controlling further comprises:
   controlling the data to be shared with the tracked program in response to a control signal input on the screen, by allowing a type of data to be shared with the tracked program, in response to a touch input on an icon indicating that the tracked program is allowed to access that type of data.

6. The method of claim 1, further comprising:
   collecting program related information of a program installed in the terminal; and
   storing the collected program related information in a database,
   wherein the controlling the data to be shared is at least partially based on the program related information in the database.

7. The method of claim 6, further comprising:
   re-collecting the program related information of the installed program at time intervals set by the terminal; and
   updating the program related information stored in the database, based on the re-collected program related information.

8. The method of claim 1, further comprising:
   collecting program related information of a program installed in the terminal; and
   storing the collected program related information in a storage medium by filing the collected program related information,
   wherein the controlling the data to be shared is at least partially based on the program related information in the storage medium.

9. A terminal configured to control data sharing, comprising:
   a tracker configured to track a program that shares data with a terminal, by using information about data the program shares obtained from a program manager of the terminal;
   an output unit configured to display the tracked program on a screen organized according to types of data, and configured to display a data-sharing flow on the screen, by displaying a connection between a type of data and the tracked program;

a recognizer configured to recognize a control signal indicating a program that is displayed on the screen; and a controller configured to control the data sharing with the tracked program, in response to a control signal input on the screen, by blocking a type of data from being shared with the tracked program in response to the control signal indicating that the tracked program is blocked from accessing that type of data.

10. The terminal of claim 9, wherein the output unit is configured to display at least one of:

a production company of the tracked program, a third party connected to the tracked program, and an icon indicating the tracked program.

11. The terminal of claim 9, wherein the controller is further configured to control the data sharing with the tracked program, in response to a control signal input on the screen, by allowing a type of data to be shared with the tracked program in response to the control signal indicating the tracked program is allowed to access that type of data.

12. The terminal of claim 9, further comprising:

a collector configured to collect program related information of a program installed in the terminal; and a storage configured to store the collected program related information in a database, wherein the controller controls the data sharing based at least partially on the program related information in the database.

13. The terminal of claim 12, further comprising:

a re-collector configured to re-collect the program related information of the installed program, at time intervals set in the terminal; and an updater configured to update the program related information stored in the database, based on the re-collected program related information.

14. The terminal of claim 9, further comprising:

a collector configured to collect program related information of a program installed in the terminal; and a file processing unit configured to file the collected program related information, wherein the controller controls the data sharing based at least partially on the program related information in the file.

15. A method to control data sharing, comprising:

collecting, using a collector, program related information of an application installed in a terminal with data sharing environment settings to be changed, using a crawling technique;

generating, using an output unit, at the terminal, a data sharing controlling page, based on the program related information;

displaying, using the output unit, at the terminal, the data sharing controlling page comprising a data flow for each type of data shared by the application.

16. The method of claim 15, further comprising:

storing the crawled program related information; and updating a database with information changing the data sharing environment settings based on the stored program related information.

17. A terminal to generate and display a page for controlling data sharing, comprising:

a collector configured to collect program related information about an application installed in the terminal with data sharing environment settings to be changed, using a crawling technique; and an output unit configured to generate a data sharing controlling page based on the program related information, and display the data sharing controlling page comprising a data flow for each type of data shared by the application.

18. The terminal of claim 17, wherein the collector is further configured to:

store the crawled program related information; and update a database with information changing the data sharing environment settings based on the stored program related information.

* * * * *